United States Patent [19]
Yamaguchi et al.

[11] 3,854,193
[45] Dec. 17, 1974

[54] METHOD OF PRODUCING COPPER CLAD ALUMINUM WIRE

[75] Inventors: Tetsuo Yamaguchi; Teruyuki Takayama; Masao Hiderita, all of Tokyo, Japan

[73] Assignee: The Fujikawa Cable Works Limited, Tokyo, Japan

[22] Filed: Dec. 14, 1972

[21] Appl. No.: 314,912

[30] Foreign Application Priority Data
Dec. 27, 1971  Japan.................................. 46-1255

[52] U.S. Cl.................... 29/473.9, 29/479, 29/480, 29/487, 72/47
[51] Int. Cl............................................ B21d 39/04
[58] Field of Search............ 29/473.3, 473.9, 474.1, 29/474.3, 479, 480, 487; 72/47, 274

[56] References Cited
UNITED STATES PATENTS
| | | | |
|---|---|---|---|
| 3,096,577 | 7/1963 | Carlson et al. | 29/473.3 |
| 3,320,666 | 5/1967 | Dion | 29/473.3 |
| 3,562,899 | 2/1971 | Stout et al. | 29/473.3 |
| 3,648,356 | 3/1972 | Ziemek | 29/473.3 X |

Primary Examiner—Richard B. Lazarus
Attorney, Agent, or Firm—Flynn & Frishauf

[57] ABSTRACT

A method of and apparatus for producing copper clad aluminum wire is provided in which a copper strip, while being formed into a cylindrical shape, is placed on the outer side of an aluminum core and the seam of the copper strip is then welded together to prepare a clad wire of the aluminum core and the copper strip, and thereafter the clad wire is subjected to a reducing process to produce a copper clad aluminum wire. The welding of the seam of the copper strip is effected in a closed atmosphere (shielding box) filled with an inert gas, and the diameter reducing operation is carried out through a die whose half-approach angle (i.e., a half approach angle) is between 35° and 55° and at a temperature below 200°C to insure a complete metallurgical bonding between the copper sheath and the aluminum core.

5 Claims, 9 Drawing Figures

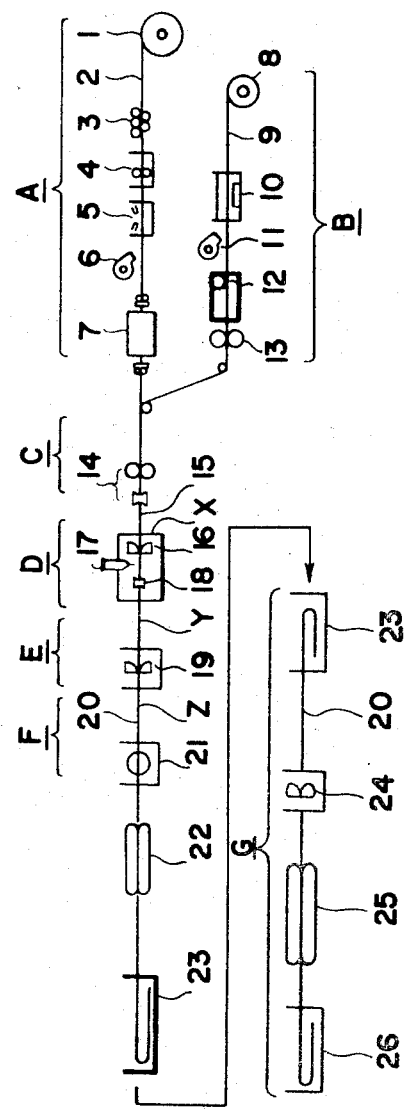

METHOD OF PRODUCING COPPER CLAD ALUMINUM WIRE

BACKGROUND OF THE INVENTION

The present invention relates to improvements in the manufacturing method of metal clad composite wires, particularly copper clad aluminum wire and to improvements in the apparatus used for manufacturing the same.

Some manufacturing methods of the above type are known in the art. Typical of these prior arts are: (a) the roll bonding process in which an aluminum core having its surface thoroughly cleaned is placed between two strips of copper from above and below and the metals are then rolled and bonded together through a pair of upper and lower rolls (U.S. Pat. Nos. 3,408,727, Nov. 5, 1968; 3,444,610, May 20, 1969; and 3,455,016, July 15, 1969); (b) the process in which an aluminum core with a clean surface is externally covered with a copper strip to provide a cylindrically formed cladding material and the clad material is then subjected to a reducing operation to firmly bond the aluminum core with the copper strip, and thereafter the material is further subjected to a heat treatment to produce a metallurgical bonding at the boundary surface between the aluminum core and the cladding material (German patent applications P2052.462.3, Oct. 26, 1970; P2052.467,8, Oct. 26, 1970; P2052.466.7, Oct. 26, 1970); and (c) the method which is known as a hydrostatic extrusion process. However, there are many disadvantages in the aforementioned prior arts.

A disadvantage of the method of (a) is that when the two copper strips are roll-bonded on the aluminum core, there results a lack of uniformity in the thickness of the two cladding metals thus roll-bonded, and moreover if the layer of the cladding metals is thin (for instance, less than 10 percent copper by volume) the process of roll bonding itself tends to become difficult. The method of (b) requiring a heat treatment during and after the diameter reducing operation is also disadvantageous in that the heat treatment is effected at an elevated temperature higher than 300°C in order to achieve the required metallurgical bonding between the cladding layer of copper and the aluminum core and therefore the effectuation of such a high temperature heat treatment prior to the complete accomplishment of the required metallurgical bonding makes it difficult to control the thickness of a diffusion layer that is to be formed by the heat treatment to a desired value (i.e., several $\mu$m). In other words, such a heat treatment frequently gives rise to the formation of brittle intermetallic compounds layers at the "copper-aluminum boundary." In the subsequent processing, these intermetallic compounds layers will be easily broken, destroying the metallurgical bonding between the copper and the aluminum and thereby causing a rupture in the copper cladding layer. Furthermore, as the degree of work hardening of the aluminum core and the cladding metal progresses in the reducing operation, the cladding metal tends to be easily ruptured by the bending due to the draft ring. In an attempt to avoid this, it has been proposed to take effect the annealing process during the drawing. Nevertheless, the same drawback as mentioned above inevitably results, since the annealing process has a tendency to cause the formation of copper-aluminum intermetallic compounds. In the method of (c) above, a uniform pressure can be applied throughout the circumference of the cladding metal, the extrusion ratio can be readily increased and the method can be applied irrespective of the thickness by volume of copper, thus avoiding such deficiencies as inherent to the method of (a) above. However, there is a drawback in that the maximum length of billets that can be used with this method is less than 2 m and therefore this method can be applied only to the manufacture of products of short length.

The foregoing difficulties are overcome by the improved method and apparatus of the present invention. It is therefore a primary object of the present invention to provide a method of producing copper clad aluminum wire by which a perfect metallurgical bonding can be achieved between an aluminum core and a copper strip without resorting to any heat treatment in the course of the manufacturing process and moreover even if the process of bending is applied, no breaking down of the bonding between the aluminum core and the copper cladding as well as no crack in the copper cladding may be caused.

It is a second object of the present invention to provide a method of continuously producing copper clad aluminum wire in which the aluminum core of a uniform diameter and a copper cladding of a uniform thickness are formed into exact concentric forms.

It is a third object of the present invention to provide apparatus for achieving the first and second objects of the present invention.

By accomplishing these objects, various advantages may be claimed for this invention. A principal advantage of the present invention is that by welding the seam of a copper strip covering an aluminum core in a closed atmosphere (shielding box) filled with an inert gas, oxidation reaction facilitated at the surfaces of the aluminum core and the cylindrical copper strip promoted by an increased temperature due to the welding operation may be controlled. to such an extent that a satisfactory metallurgical bonding between the two metals can be achieved by the process of reducing through a die. There is another advantage in that by subjecting a clad wire formed with an aluminum core and a copper cladding to the process of reduction at a temperature lower than 200°C through a die having a large half-approach angle, the copper clad aluminum wire with a strong metallurgical bonding between the two metals can be obtained without the application of any heat treatments so that no cracking may be caused in the metal cladding even though the wire is subjected to the process of bending or the like. In the following description, the term "reducing process" covers the operation in which both the squeezing die 19 and the drawing die 24 are employed.

The foregoing and other objects, features and advantages of the invention will appear more fully hereinafter. The detailed description which follows together with the accompanying drawings illustrates an embodiment of the present invention. It is to be understood, however, that the drawings and descriptions herein are for illustrative purposes only and are not to be construed as defining the limits of the invention.

BRIEF DESCRIPTION OF THE DRAWINGS

FIG. 1 is a diagram showing schematically the cladding step in a manufacturing process of copper clad aluminum wire according to the present invention;

FIGS. 2, 3 and 4 are cross-sectional views of the wire at points, X, Y and Z in FIG. 1;

DESCRIPTION OF THE PREFERRED EMBODIMENT

Figure 5:
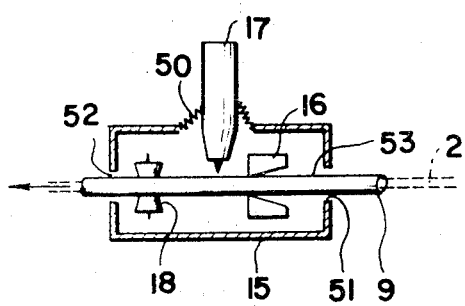
FIGS. 5 and 6 are sectional views showing embodiments of the hermetic shielding box used in the welding step.

Referring now to FIG. 1, an outline of the method of the present invention will be explained first. An aluminum wire constituting a core metal is passed through a surface cleaning section (a), and when the aluminum wire is moved to the left in the illustration a copper strip is fed through a separate surface cleaning section B to externally cover the aluminum core so that in a cladding section C the copper strip is wound around the aluminum core while the former is being gradually formed into the round form. Thereafter, the abutting ends of the rounded copper strip are welded in an inert gas atmosphere in a welding section D where one of the most important processes which is considered as characteristic for the present invention is performed. And after passing through a squeezing section E where the gap between the aluminum core and the copper strip is removed, the material is brought to an after-treatment section F from which the material is further delivered to a drawing section G, which constitutes one of the most characteristic features of the method of the invention, and in which a complete and sound metallurgical bonding is achieved between the aluminum core and the copper cladding.

Next, the individual processing sections outlined above will be explained in detail with reference to the drawings. It is to be noted that aluminum core used in the present invention should preferably consist of a soft aluminum material. This soft aluminum material can be uniformly scrubbed and hence the process of surface cleaning can be more effectively performed as compared with hard material, and moreover the soft aluminum exhibits inherent uniform metal flow and it is thus capable of insuring a good metallurgical bonding with a cladding metal and it is also superior in drawability.

In the surface cleaning section A, the soft aluminum core is first subjected to the process of surface cleaning.

The aluminum core 2 coiled on an aluminum core uncoiler 1 is moved through a straightener 3 into a first cleaning tank 4 where organic solvent, such as, trichloroethylene is sprayed over the aluminum core while the latter is being subjected to brushing by hair brushes to remove dirt, such as the oils and dust on the surface of the aluminum core. The aluminum core is then moved into a second cleaning tank 5 where the dirt on the surface of the aluminum core is completely cleaned by a jet of organic solvent such as trichloroethylene and thereafter the aluminum core is dried by an hot-air dryer 6. The aluminum core 2 is further moved into a surface cleaning abrader 7 which constitutes one of the characteristic features of the present invention and the oxide film formed on the surface of the aluminum core 2 is uniformly removed. These steps constitute the surface cleaning section A, and the surface cleaning abrader 7 comprises, in its most preferred form, a plurality of brushes of fine metal wire (e.g., stainless steel wire) which are arranged radially with respect to the aluminum core so as to be rotated at high speed to brush off the oxide film on the surface of the aluminum core. Aluminum powders produced during this brushing operation are collected by a suction dust collector (not shown) installed on the entry side of the abrader 7 without letting them scatter.

On the other hand, a copper strip 9 coiled on a copper strip uncoiler 8 is fed through the surface cleaning section B. In other words, similarly with the aluminum core 2, the dirt and soils on the surface of the copper strip 9 are removed in a tank 10 containing an organic solvent and equipped with an ultrasonic cleaner. The copper strip 9 is then completely dried in a hot-air dryer 11 and the surface of the copper strip 9 is further subjected to brushing by metal brushes 12 (e.g., brushes made of fine stainless steel wire). Copper powders produced in this brushing operation are caught by a suction dust collector (not shown) installed on the entry side of the surface cleaning abrader 12 so that the copper powders may not be scattered. Thereafter, the copper strip 9 is cut to a given width so that it can be formed into a cylindrical shape to be covered around the aluminum core 2.

The aluminum core 2 and the copper strip 9 whose surfaces have been thus cleaned separately are then fed together to a cladding section (c). In this section, a plurality of sets of forming rolls 14 are arranged so that the copper strip is gradually formed into a cylindrical form to cover the aluminum core. The clad wire thus prepared from the aluminum core and the copper strip is then delivered to a welding section D.

The welding section D constitutes a very unique feature of the manufacturing method according to the present invention. In other words, this welding section comprises a forming die 16 designed to hold the copper strip placed around the aluminum core in its cylindrical form and a welding apparatus 17, for example, a TIG arc welding apparatus or a plasma arc welding apparatus, both of which are disposed within the shielding box 15. The shielding box 15 is filled with inert gas (for example, argon (Ar), helium (He), carbonic acid gas ($CO_2$), nitrogen ($H_2$) or their mixture) at a pressure higher than atmospheric pressure (e.g., at higher than 0.1 mm of water) so as to maintain therein an inert gas atmosphere that prevents oxidation of the metals. In this welding section, the copper strip placed around the aluminum core is held in its cylindrical form by the forming die 16 as mentioned earlier and the seam of the copper strip is welded together by the welding apparatus 17. These processes are all carried out in the inert gas atmosphere so that oxidation of the inner and outer surfaces of the copper strip as well as oxidation of the surface of the aluminum core are prevented, thereby eliminating the formation of metal oxide films which may result in a decrease in the bonding force between the copper sheath and the aluminum core, a deterioration in the resistance against chemical corrosion and a decrease in the strength of the clad wire obtained. In addition, this elimination of formation of metal oxide film makes it possible to insure the formation of a very strong metallurgical bonding between the copper sheath and the aluminum core through the subsequent reducing process based on a unique cold wire drawing operation of the method of the present invention without resorting to a metallurgical bonding layer formed by a heavy roll bonding process or by a heat treatment. The construction of the shielding box 15 and others will be explained in detail with reference to FIGS. 5 and 6.

Figure 6:
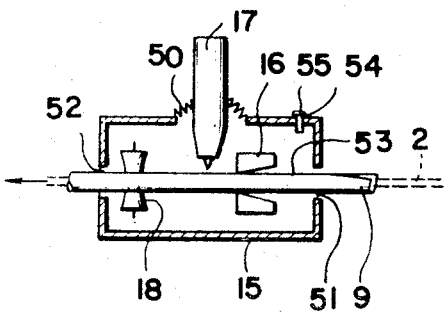

Referring first to FIG. 5, numeral 9 designates the copper strip in the form of a cladding tube and its direction of movement is indicated by an arrow. Numeral 16 designates the forming die, 17 the welding torch, 15 the shielding box, 50 a bellows for connecting the shielding box 15 with the welding torch 17. The bellows 50 may be of any kind provided it is made of a resilient material. For example, it may consist of a rubber sheet with a centrally formed cylindrical opening having a diameter which is slightly smaller than that of the welding torch 17. However, a clearance of about 3 mm may be provided without affecting the effectiveness of shielding and such a clearance has the effect of making the travel of the welding torch 17 easier. Numerals 51 and 52 designate the entrance and exit for the copper cladding tube. The diameter of the entrance 51 and the exit 52 may be selected such that there exist a clearance of about 5 mm on all sides thereof with respect to the copper cladding tube 9. Numeral 53 designates the end-to-end of the copper cladding tube which sould be welded after passing forming die 16. The minimum dimension of the shielding box 15 should preferably be such that it covers from the portion of 53 to the completely welded joint of the copper sheath. This permits the inert gas to flow into and maintain an inert gas atmosphere along the inner surface of the copper cladding tube, thereby preventing the formation of oxide film at the welded joint on the inner surface of the copper cladding tube as well as at the surface of the aluminum core. Preferably, the shielding box 15 may be made of a transparent material, such as, acrylic resin or glass so that the inside of the shielding box 15 can be seen from the outside. This provides facility when the positioning of the welding torch 17 is necessary. There is no problem with these materials from the aspect of their mechanical strength and thermal properties. While the dimension of the shielding box 15 depends on the diameter of the copper cladding tube 9 to be produced, in one example of the actual application to the copper cladding tube 9 of 2 cm in diameter, a shielding box of 10 × 20 × 15 cm was quite effective in preventing oxidation of the metals. The flow rate of the inert gas (argon) was about 15l/min. The shielding box 15 may be provided with an inlet port 54 for inert gas as shown in FIG. 6. While this inert gas inlet port 54 serves as an auxiliary inlet for maintaining the predetermined pressure of the inert gas atmosphere within the shielding box 15, the provision of the inlet port 54 in the vicinity of the entrance 51 can produce a good result since it tends to improve the shielding effect remarkably by virtue of the curtain action of the introduced gas. Numeral 18 designates guide rolls. The shielding box 15 covers only a welding zone and thus the consumption of inert gas can be reduced and at the same time the operating procedure can be simplified.

When the welding operation has been completed in the manner described above, as shown in FIG. 3 (See the point Y in FIG. 1), there still exists some clearance between the copper cladding and the aluminum core and this clearance is removed in the following squeezing section E. Numeral 19 designates a die designed for squeezing. The cooper clad aluminum wire which has been squeezed through this die 19 has a cross section as shown in FIG. 4. At a portion Y in FIG. 1, there is a sufficient amount of inert gas remaining in the gap between the aluminum core and the copper sheath. In the reducing section E, the temperature of the copper clad aluminum wire does not exceed 200°C.

Following this squeezing operation, the copper clad aluminum wire 20 is passed to the after treatment section F where the lubricant on the surface of the copper cladding is removed in an organic solvent tank 21, such as, a tank filled with tricholoroethylene or perchloroethylene and thus cleaned copper clad aluminum wire is taken up by a caterpiller 22 from which it is received in a large tray 23. The copper clad aluminum wire 20 received in the tray 23 is then fed to the drawing section G constituting the most unique feature of the present invention and in this section a complete and sound metallurgical bonding is achieved between the aluminum core and the copper covering. While in the description above the copper clad aluminum wire which has been received by the tray 23 after diameter reducing operation (squeezing) through the die 19, is subjected to a further diameter reducing operation (drawing) by the die 24, the present invention is not limited to this method and the copper clad aluminum wire, squeezed through the die 19, may be directly drawn by the die 24, eliminating the use of trays. The reduction of diameter is effected, at a temperature below 200°C, by means of a die 24 whose half-approach angle is in the range between 35° and 55°. This drawing section utilizes a straight-line wire drawing system comprising in combination a pair of trays of at least 2 m in diameter (the supply side tray 23 and take-up side tray 26) and a caterpillar take-up device 25. The use of this system constitutes one of the characteristic features of the present invention. The reason is that while the reduction of diameter of the copper clad aluminum wire up to a point of accomplishing a complete metallurgical bonding between the copper and the aluminum tends to cause work hardening and hence a considerable reduction in the drawability of the copper cladding, the combined use of the die 24 having a half-approach angle of 35° to 55° and the straight-line wire drawing system permits the reduction of diameter without use of any process heat treatment or process annealing which is likely to cause the formation of intermetallic compounds and without involving any deterioration in the drawability of the copper cladding and hence the desired metallurgical bonding can be accomplished between the copper cladding and the aluminum core.

In this connection, the combined use of such a specially designed die and wire drawing system has never been attempted with customary methods and therefore it has always been considered essential to include the process annealing treatment. In the case of the draft ring method, without annealing treatment, addition of bending stress to tensile stress resulted in the rupture of copper cladding and thus satisfactory wire drawing was not possible. Moreover, the use of process annealing still gives rise to an inconvenience promoting the formation of copper-aluminum intermetallic compounds as mentioned above.

Figure 7:
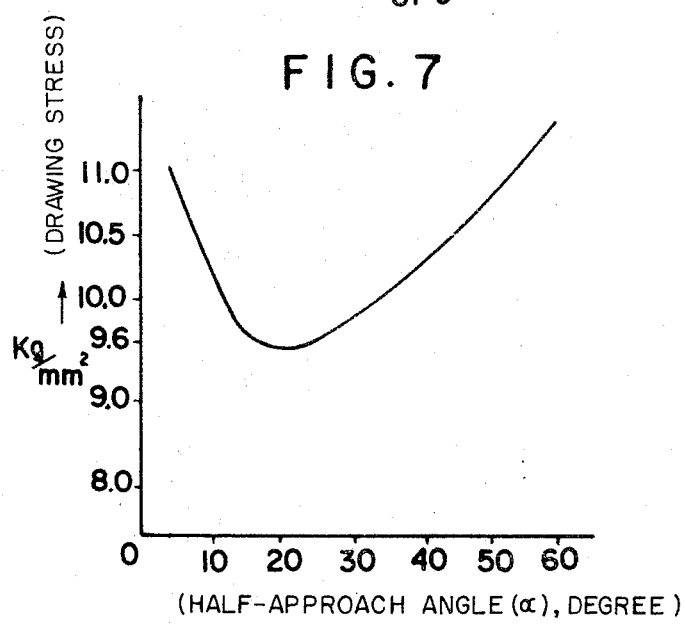
FIG. 7 is a graph showing the relation between the drawing stress and the half-approach angle ($\alpha$)

In a known of customary wire drawing method, the shape of the die is selected so that the force required for wire drawing through the die can be minimized. According to the various researches conducted by the inventors on the relationship between the drawing stress and the shape of die as well as the relationship between the metallurgical bonding of clad wire and the shape of die, it has been confirmed that the drawing stress shows a minimum value at a certain half-approach angle of a die, and in the ordinary wire drawing operation a die is used which has a half-approach angle (about 20°) that insures such a minimum drawing stress. This fact is shown in FIG. 7. Evidently it follows that as the approach angle is decreased further, the drawing stress increases considerably owing to the friction between the wall of the die and the wire, while on the other hand an increase in the approach angle results in an increase in the drawing stress owing to an increased internal shearing stress.

With respect to the metallurgical bonding in the clad wire, it has been concluded that plastic flow has contributed to the formation of the bonding between the metals and thus if the metals are subjected to deformation in such a manner as to insure a maximum plastic flow between the metals, the bonding may be more readily achieved than in the case where the deformation is effected with less plastic flow.

The present invention has been developed on the basis of this knowledge. When the wire drawing designed to increase internal shearing stress and hence plastic flow between two metals through the use of an exceptionally large approach angle was applied to the production of copper clad aluminum wire, a complete metallurgical bonding was achieved between the copper and the aluminum with a 80 percent reduction of area in drafting with a half-approach angle of 45°, for example. On the other hand, when the wire drawing was conducted with the ordinary die (whose half-approach angle was about 20°), it was necessary to reduce the cross-sectional area by 90 percent or more in order to accomplish the required metallurgical bonding between the copper and the aluminum. The value of a half-approach angle that can accomplish the required metallurgical bonding between the cladding metal and the core metal of the clad wire was between 35° to 55°. If the half-approach angle is less than 35°, the result would be the same as that which is obtainable with the ordinary die (whose half-approach angle is about 20°), whereas if the half-approach angle is larger than 55°, it would be necessary to reduce the amount of reduction in cross-sectional area per pass, otherwise the cladding metal layer would be cracked thereby making the wire drawing itself impossible.

While the explanation has been made in respect of cold drawing, if the warm drawing process is used employing a die having a half-approach angle ranging from 35° to 55° mentioned above, the formation of bonding between the coppper and the aluminum can be facilitated further. For instance, when the drawing of the wire was conducted at temperatures ranging from 150° to 200°C where no formation of intermetallic compounds would take place, formation of a firm bonding between the copper strip and the aluminum core was attained with the total reduction in cross-sectional area of less than 70 percent. In this case, however, it should be noted that if the wire drawing for reduction of diameter is carried out at a temperature higher than 200°C, intermetallic compounds would be formed between the copper and the aluminum thus involving the danger of reducing toughness of the clad wire produced.

Figure 8:
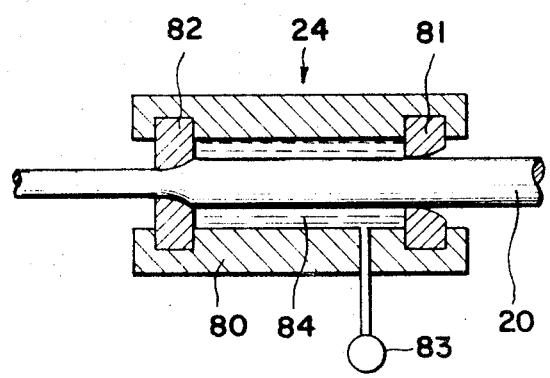
FIG. 8 is a longitudinal view showing an embodiment of the drawing die used in the reducing step.
Figure 9:
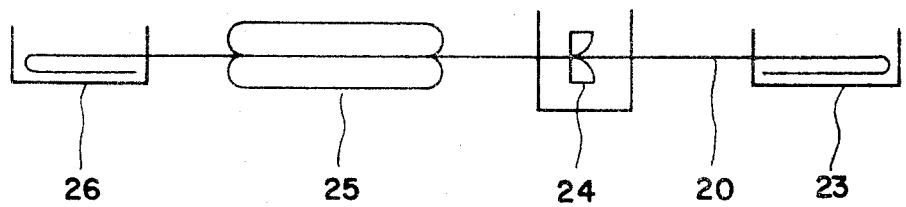
FIG. 9 is a diagram showing schematically the reducing step of copper clad aluminum wire following the cladding step.

The die 24 having its half-approach angle adjusted in the way described above may be employed in the pressure lubricated drawing of wire in the presence of lubricating oil. The detail of this application will be explained with reference to FIG. 8, in which numeral 80 designates a housing of a pressure lubricated drawing device comprising a brake die 81 mounted on the entering side where the metal wire is introduced into the housing and a sizing die 82 mounted on the exit side of the housing and a lubricating oil 84 is forced into a chamber defined within the housing 80 by an externally provided pump 83. The copper clad aluminum wire 20 is forcedly drawn in the presence of the lubricating oil 84 through the sizing die 82 having a large half-approach angle. While customary methods of pressure lubricated drawing employ a die whose half-approach angle is in the vicinity of 20° and are used simply for the purpose of diameter reducing operation, the pressure lubricated drawing device employed in the method of the present invention employs the sizing die 82 whose half-approach angle has been increased so that a complete bonding can be attained between the cladding metal and the core metal of the copper clad aluminum wire when it is drawn through the sizing die 82. Thus, this device also constitutes one of the characteristic features of the present invention.

We claim:

1. A method of producing a copper clad aluminum wire comprising
    covering an aluminum core longitudinally with a copper strip in cylindrical form;
    facing the resulting seam of said copper strip and welding said seam together in a shielded atmosphere comprising an inert gas at a pressure greater than atmospheric pressure to form a copper clad aluminum wire, and
    reducing the diameter of said copper clad aluminum wire through a die having a half-approach angle of from 35° to 55° at a temperature below 200°C.

2. A method according to claim 1, wherein said aluminum core consists of a soft aluminum core.

3. A method according to claim 1, wherein said aluminum core and said copper strip are each subjected to a surface cleaning treatment comprising removing soils such as oils and dirt on the surfaces of said metals and thereafter scrubbing and removing oxide films on the surfaces of said metals by brushing them off with a fine metal wire brush prior to so covering said aluminum core with said copper strip.

4. A method according to claim 1, wherein the seam of said copper strip is welded together in the presence of an inert gas selected from the group consisting of helium gas (He), argon gas (Ar), carbonic acid gas ($CO_2$), nitrogen gas ($N_2$), and a mixture thereof and at a pressure higher than 0.1 mm. of water.

5. A method of claim 1 wherein the diameter is so reduced in the presence of a lubricant.

* * * * *